United States Patent

[11] 3,555,335

[72] Inventor Bertrand H. Johnson
Murray Hill, N.J.

[21] Appl. No. 802,853
[22] Filed Feb. 27, 1969
[45] Patented Jan. 12, 1971

[73] Assignee Bell Telephone Laboratories, Incorporated
Murray Hill, Berkeley Heights, N.J.
a corporation of New York

[54] ELECTROLUMINESCENT DISPLAYS
7 Claims, 6 Drawing Figs.

[52] U.S. Cl. 313/108, 313/109.5, 313/115
[51] Int. Cl. H01j 1/62, H01j 63/04
[50] Field of Search 317/234/4, 234/3, 235/27; 313/108, 113, 109.5; 250/217SSL; 350/292; 240/41.36, 41.35F, 41.35E,D

[56] References Cited

UNITED STATES PATENTS

| | | | |
|---|---|---|---|
| 2,341,658 | 2/1944 | Salani | 240/41.36 |
| 3,259,776 | 7/1966 | Wallace | 313/113X |
| 3,290,539 | 12/1966 | Lamorte | 313/108X |
| 3,308,452 | 3/1967 | Michel et al. | 313/108X |

*Primary Examiner*—James W. Lawrence
*Assistant Examiner*—David O'Reilly
*Attorneys*—R. J. Guenther and Arthur J. Torsiglieri

ABSTRACT: The specification describes a device for enlarging the apparent light-emitting area of an electroluminescent diode. The device is a faceted body having a specular surface designed to be placed around the light-emitting diode.

INVENTOR
B. H. JOHNSON
BY
ATTORNEY

ELECTROLUMINESCENT DISPLAYS

This invention relates to electroluminescent devices.

Recent advances in the efficiency and reliability of electroluminescent diodes indicate that these devices will offer replacements for incandescent lamps in many applications. Currently, a severe restriction on their use is the high cost of the diode materials. This limits the size of the device for the application under consideration. In small displays, with the present state of the art, the cost of material for the area of a normal-sized character is still so high that character arrays are prohibitively expensive except for the most sophisticated applications. A similar problem exists in the case of indicator lights. Here, although the viewing area is small, the unit is expected to be inexpensive, so the cost factor of the material is still unfavorable.

It is well recognized in the art that a method for significantly reducing the amount of electroluminescent material for a given luminescent area will result in considerable cost savings and may take electroluminescent display and indicator devices competitive in new market areas. The importance of such a contribution in providing the impetus to an infant industry cannot be overemphasized.

This invention represents a significant step toward that solution and may, in some applications, achieve the desired objective. The invention is a conventional electroluminescent diode with an integrated structure for increasing the apparent light-emitting area. The structure is essentially a specular faceted body of a specified design placed around the diode. It functions in the following manner.

Assume the diode to be a point light source. (This assumption is warranted by the small size of the diode necessitated by cost considerations). The light radiates in all directions with equal intensity. From any viewing point the light will appear intense but very small. Typical diode areas are so small that the light-emitting area is on the edge of the resolving power of the eye, so that even though the light is visible, it is subjectively unpleasant to view. A character format made from such light sources appears as an array of unpleasant points of light and is rather ineffective.

The faceted body placed around the diode increases the apparent light-emitting area. Each facet reflects the light from the diode so that the viewer apparently sees many light-emitting diodes spread over the area of the faceted body. If the facets are circular, the reflected light will actually appear as a ring from each facet. The factor which is important to the invention and which makes the faceted body so effective is the size of the dimensions involved. The physical separation between the images reflected of the multiple facets is small enough so that the eye does not clearly resolve it. The overall effect to the viewer is that of a light source continuously and evenly distributed over the area of the faceted body. It is important to recognize that this same effect cannot be produced by an ordinary reflector, nor is it effective for larger scale devices where the eye can resolve a series of spots or rings. In the case of an ordinary reflector, such as a spherical reflector, the light is spread evenly over a large area. However, the light intensity at any point in this area may not have sufficient intensity for proper viewing. This will be explained in more detail below.

These and other aspects of the invention may become more apparent from the following detailed description. In the drawings.

Figure 1:
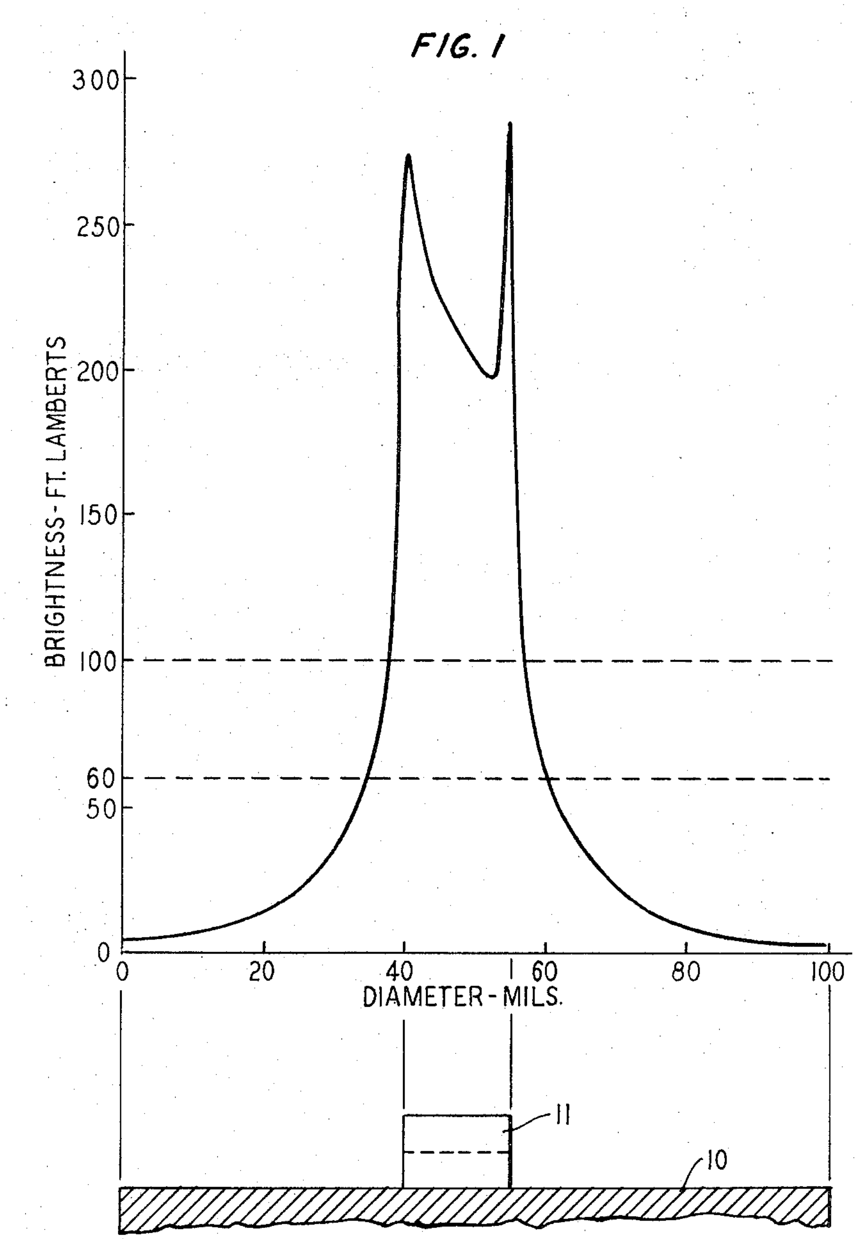
FIG. 1 is a schematic representation of the light flux from a small electroluminescent diode mounted on a standard header.

FIG. 1 describes the intensity of light emanating from the surface of a G*a*P electroluminescent diode. The ordinate is in foot-lamberts. The profile was obtained by vertically scanning across the surface with a photometer. The header 10 is formed by beryllium oxide which was chosen for high reflectivity. The diode is indicated at 11.

Figure 2:
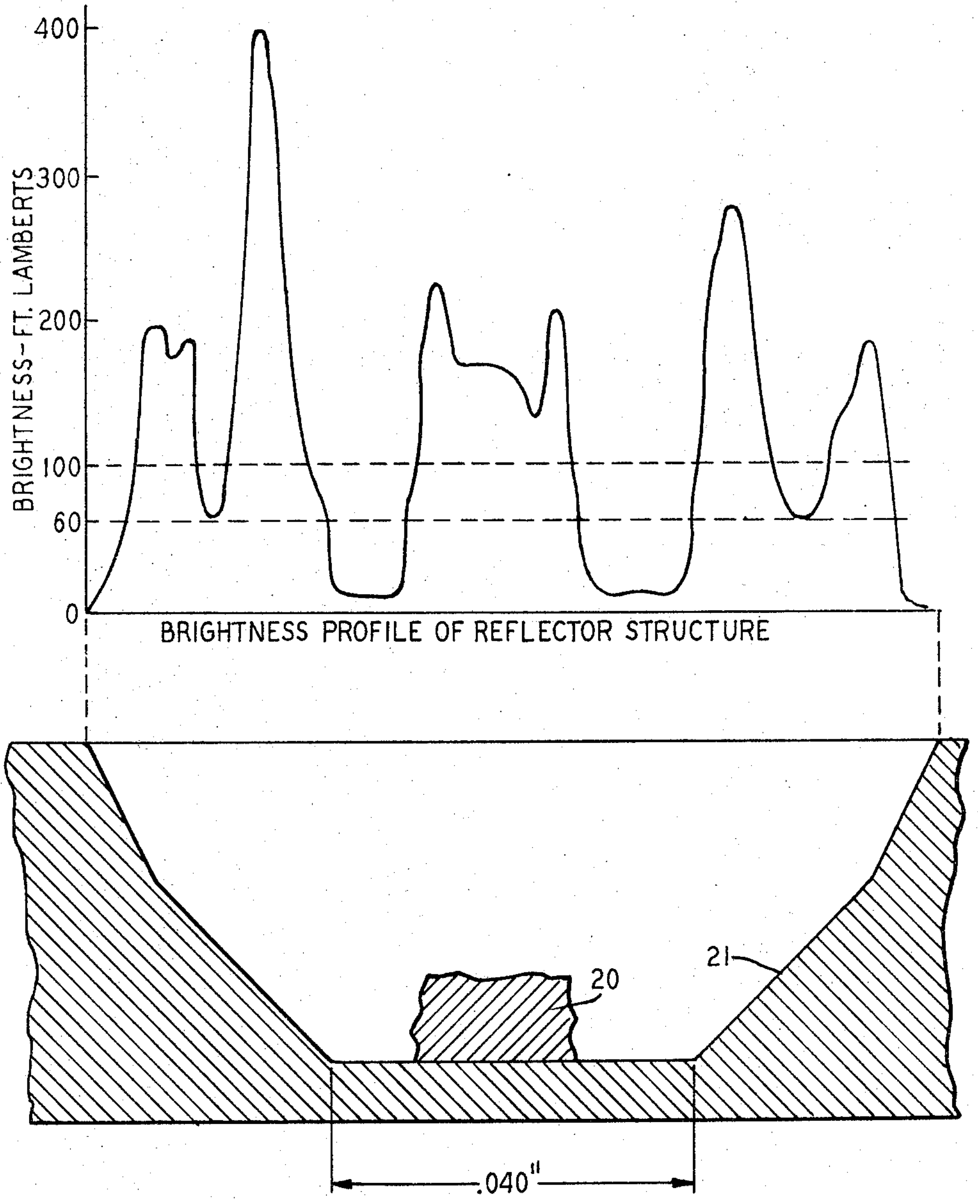
FIG. 2 is a schematic representation similar to FIG. 1 showing the light flux from an electroluminescent diode mounted on a faceted body in accordance with this invention.

FIG. 2 gives the same data for a similar G*a*P electroluminescent diode 20, this time mounted on a faceted body 21 according to the invention.

A comparison of the light intensity profile of FIG. 1 with that of FIG. 2 gives a graphic indication of the value of the faceted reflector. Under ordinary interior lighting conditions the illumination level varies from 5 foot-candles in a relatively dim lit room to over 100 foot-candles in an exceptionally well illuminated area. If a diode array display or a diode indicator light is to be properly viewed it is necessary that the light from the diode is sufficient to give contrast with the background light. From environmental studies it was determined that the light level from the display should generally exceed 60 foot-lamberts and that it would be highly desirable for this level to exceed 100 foot-lamberts. An examination of FIG. 1 reveals that the diode in the standard mount satisfies these criteria only at the center region, i.e., over the area corresponding to the actual area of the diode. As the initial premise was that such a light source is unsatisfactory due to its size (irrespective of its brightness), a display incorporating this device is ineffectual.

Turning to FIG. 2 it is seen that the faceted reflector 21 dramatically changes the brightness profile. The first recommended brightness level, 60 foot-lamberts, is met by the entire area of the reflector so that the diode size is effectively increased by a factor of approximately 40. (The diode was 15 mils square while the maximum diameter of the reflector was 95 mils.) It is also seen that the level of 100 foot-lamberts (the secondary standard) is exceeded over a significant portion of the reflector area.

The presence of several discrete peaks in the profile is not resolved by the eye. The eye tends to integrate the light over the whole area giving a bright, uniform appearance. This effect points out how the faceted reflector is distinguishable from an ordinary reflector. A spherical or continuously curved reflector would produce a uniform increase in brightness across the reflector. However, with a limited amount of light available a uniform increase is not effective in the same way as the series of peaks in FIG. 2. If the threshold level established by the background illumination exceeds the uniform brightness contained with a curved reflector, then the display will not be visible. However, if the same amount of light is distributed in a series of peaks, as occur in the profile of FIG. 2, and these peaks exceed the threshold level, the eye will detect the illumination and it will appear, as explained above, that the entire reflector area is illuminated at the peak brightness level.

Thus it is appreciated that the two vital aspects of this invention—i.e., the limited light-emitting area of the electroluminescent diode such that the area is at the fringe of the resolving power of the eye, and the faceted reflector body—are combined to give a result which is expected to be of considerable importance to the art. Since the size of the light-emitting area is important to the invention, it is useful to prescribe this parameter specifically. The diode areas used for much of the empirical studies leading to this invention were 15 mils square. On the basis of material cost considerations and the optical principles upon which this invention is based, it is concluded that this invention is applicable to electroluminescent diodes having an area of less than 2,000 $mils^2$.

The preferred structural requirements of the faceted reflector plate are the following. Since the flat regions of the faceted body 21 of FIG. 2 produce "dead spots" in the brightness profile, it is ordinarily desirable that the flat area not exceed one quarter of the overall reflector area. One way of minimizing this ineffectual region is to construct the first facet contiguous to the diode (as is the case in one of the embodiments described below). For the purpose of this invention, at least two facets are necessary to achieve the effects desired. From the results of extensive empirical studies it is recommended that one of the facets make an angle of at least 35° with the place of the electroluminescent diode (light-emitting surface), while the other should be at an angle of at least 60° with respect to the same reference plane. These angles have been found to give good wide-angle viewing. If more than two facets are used, angles intermediate and outside these values can be used to advantage. Increasing the angle of the outermost facet increases the low angle effectiveness and increasing the overall number of facets increases the brightness uniformity. It will be recognized that the latter expedient, if carried too far, will destroy the effectiveness of the invention. Accordingly, it is suggested that the number of discrete light-reflecting facets be restricted to four or less.

As indicated previously these principles can be applied to advantage to character displays. Of these the numeric display has been of principal interest. The seven bar format has become conventional for numeric displays and an illustrative embodiment of the invention will be described in connection with this format.

Figure 3:
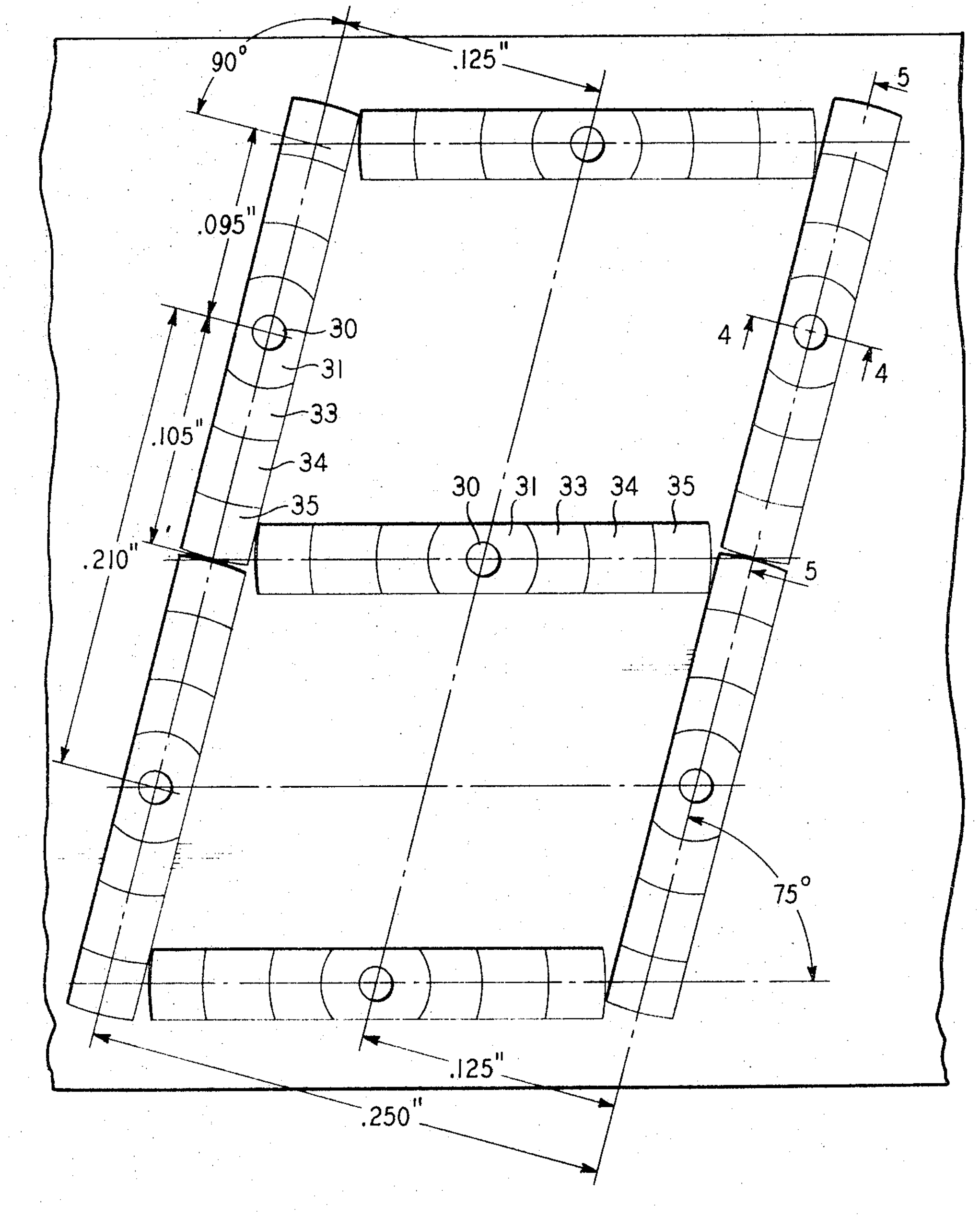
FIG. 3 is a perspective view of an electroluminescent format (for displaying numerical characters) that relies on the principles of the invention.
Figure 4:
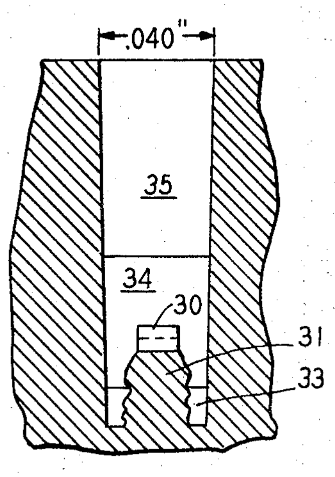
FIG. 4 is a transverse section of a typical bar in the format of FIG. 3 (the section line is indicated on the upper right-hand bar of FIG. 3) showing the shape of the slot.
Figure 5:
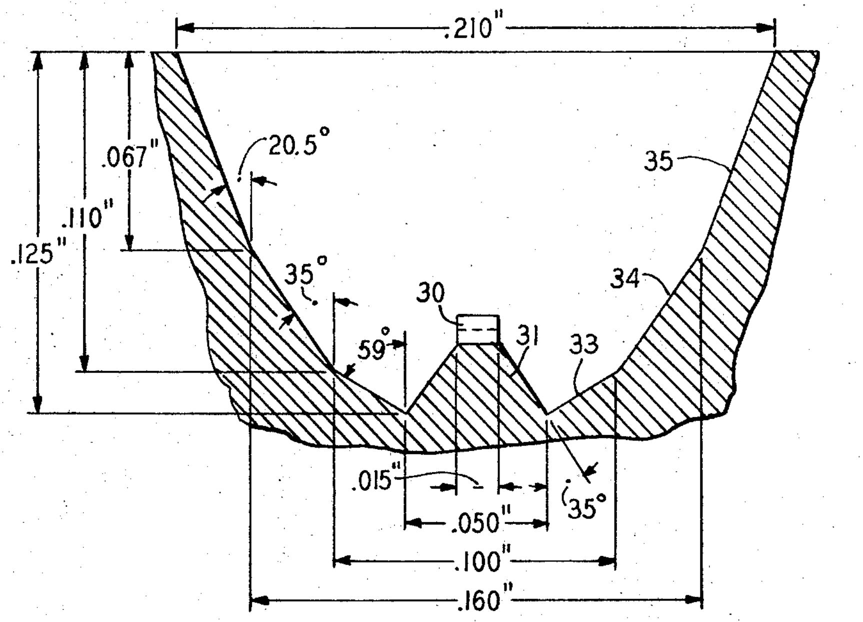
FIG. 5 is a longitudinal section similar to FIG. 4.

FIG. 3 is a plan view of a seven bar format using disc-shaped electroluminescent diodes 30. (This shape is selected as exemplary but is unimportant to the overall effect. Quite often the diodes will be made from square chips.) The dimensions are given for an appreciation of a typical size. Diodes 30 are mounted in each bar and the bars are recessed in the center with the facets extending toward the surface of the array at each end. This aspect is more clearly seen in FIG. 4 which is a transverse section through the center of one of the bars as indicated on the upper right-hand bar of FIG. 3. The longitudinal section through this bar is shown in FIG. 5. Again typical dimensions are shown for purposes of illustration.

This device has a pedestal 31 upon which the electroluminescent diode 30 rests. The first reflecting facet 33 begins at a point relatively close to the base of the pedestal (seen in FIG. 5). The elevation of the diode on the pedestal increases the total light flux reflected by the three facets 33, 34 and 35. The slight pitch to the sidewalls evident from FIG. 4 is also helpful in enhancing reflectivity in the structure.

This faceted slot structure is also useful in alphanumeric formats as well as other displays utilizing bar formats.

From the dimensions given in FIG. 5 it can easily be calculated that the active light-emitting area of the diode is less than 0.3 percent of the total apparent area of the reflecting surface (area of the slot at the surface). This particular structure is very effective from a subjective viewing standpoint. It is thus evident that the use of smaller reflectors or larger diode area-to-reflector area ratios will be at least as useful. It would be expected that the advantages of this invention would be realized for ratios as large as 1/10th.

Various methods may be employed for constructing the structures described above. A simple technique is to form the faceted slots in a soft metal surface by the well-known "-coining" process. Copper and gold are sufficiently soft and ductile to be useful in this connection. Other fabrication methods will become evident to those skilled in the art.

Figure 6:
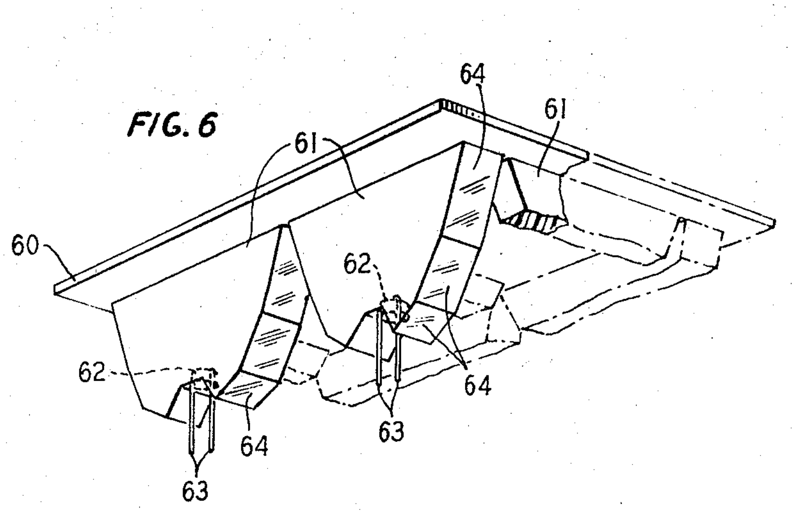
FIG. 6 is a perspective view of an alternative embodiment illustrating a useful method for manufacturing an array similar in format to that of FIG. 3.

A particularly attractive method for fabricating a structure like that of FIGS. 3 through 5 is to mold the reflector using a resin. The reflector body may be produced to correspond to the structure appearing in FIG. 5 and the inner reflecting surface produced by spray or vapor coating with an appropriate reflecting material. Alternately, the structure of FIG. 5 can be used as a mold in which case the reflector would comprise a male member. Using this approach the diodes can be placed in the mold prior to casting so that the casting process effectively encapsulates the diodes. Appropriate electrodes (not shown) can be provided prior to casting. This form of assembly is shown in FIG. 6 which is a perspective view of a seven bar format display in which the cover plate 60 is integral with the faceted slots 61. The whole plate is molded or cast in one integral piece with the electroluminescent diodes 62 placed in the mold prior to molding and thus incorporated into the assembly during the molding operation. Diode leads 63 extend from the casting. The assembly can be molded from any of a variety of known transparent resins, e.g., polymerized methylmethacrylate. The faceted surfaces 64 are covered with a reflecting coating such as evaporated aluminum.

In some cases it may be desirable to provide a filter in combination with the electroluminescent diode. For instance, combining a red light filter with a red-emitting gallium phosphide diode will reduce the background illumination emanating from the reflecting surfaces. If an assembly such as that shown in FIG. 6 is employed it is convenient to incorporate the active filtering material into the casting resin. For example, an appropriate amount of a stable organic dye such as thioindigo red can be mixed into the resin prior to casting.

The boundaries of each faceted surface appear curved in FIG. 3. A straight boundary is equally effective in the elongated slot structure. For the usual character format, a slot having a length of at least 3.5 times the average width is preferable for legibility. However, exceptions to this requirement may be made in certain cases as for forming hyphens, periods, or for certain bars of a complex array. If a molding or coining technique is used to form the assembly the shape of the bars can easily be varied. It is not essential that they be rectangular in shape but a degree of elongation equivalent to that described above will ordinarily be used.

The slope of the sidewalls evident from FIG. 4, while not essential to the invention, is considered to be a preferred expedient. A slope of at least 1 percent on each sidewall is recommended. More severe slopes can be used to improve low-angle viewing. In a slotted structure having dimensions comparable to those described here it is not considered feasible to have faceted sidewalls. Multiple reflections including the sidewalls no doubt occur in the structures described.

The recommendations discussed in connection with the circular facets of FIG. 2 that the number of facets be restricted to at least two but not more than four must obviously be adjusted in the case of the structure of FIGS. 3—5. Since the sidewalls interrupt each facet the number of discrete facets may be considered to be twice the number in the circular case.

Various additional modification and extensions of this invention will become apparent to those skilled in the art. All such variations and deviations which basically rely on the teachings through which this invention has advanced the art are properly considered within the spirit and scope of this invention.

I claim:

1. An electroluminescent display device comprising a small electroluminescent diode, the diode having an active area capable of emitting light of less than 2,000 mils$^2$ (as measured in a plane normal to the plane of the intended viewer) and a reflector means associated with the diode for expanding the light-emitting area, the reflector means characterized by a multifaceted specular surface having an apparent reflecting area (as measured in a plane normal to the intended viewer) of more than ten times the active area of the diode and at least two facets, one of which extends from the region of the diode toward the intended viewer and at least one of which makes an angle of at least 35° with the plane of the diode and another of which makes an angle of at least 60° with the plane of the diode.

2. The display device of claim 1 wherein one of the said facets extends from below the plane of the diode toward the intended viewer.

3. An electroluminescent light display device in which the apparent light-emitting area exceeds the area of actual light-emitting material comprising a light-emitting electroluminescent diode and a reflector means associated with said diode, the device characterized in that the reflector means is formed in the geometry of at least a portion of an alphanumeric character with the length of the reflecting area at least 3.5 times the width so as to form a slot, the reflector placed so that the diode rests at the approximate center of the slot but occupies less than 1/10 of the area of the slot and the reflecting area being composed of at least two facets extending from the region of the diode toward the surface of the display in the direction of the intended viewer.

4. The device of claim 3 wherein at least one of said facets extends from below the plane of the diode toward the intended viewer.

5. The device of claim 3 wherein the longitudinally extending walls of the slot are essentially vertical.

6. An alphanumeric electroluminescent device comprising an electroluminescent diode having an active light-emitting area of less than 2,000 mils$^2$ and a reflector for increasing the apparent light-emitting area of said diode, the reflector comprising a slot-shaped specular surface, the slot forming at least a portion of an alphanumeric character the maximum cross section area of which is at least 10 times the active light-emitting area of the diode and has a length-to-width ratio of at least 3.5, the longitudinally extending sidewalls of the slot extending essentially vertically, and the bottom surface of the slot comprising at least four essentially planar facets extending from the middle region of the slot at the bottom thereof to the ends of the slot with the diode situated in the middle region.

7. The device of claim 6 wherein the longitudinally extending sidewalls of the slot have a pitch of at least 1 percent.